(12) United States Patent
Lazzarini et al.

(10) Patent No.: US 9,968,113 B2
(45) Date of Patent: May 15, 2018

(54) MACHINE FOR MAKING ICE CREAM

(71) Applicant: ALI S.p.A.—CARPIGIANI GROUP, Milan (IT)

(72) Inventors: Roberto Lazzarini, Reggio Emelia (IT); Andrea Cocchi, Calderara di Reno (IT)

(73) Assignee: ALI S.P.A.—CARPIGIANI GROUP, Milan (IT)

( * ) Notice: Subject to any disclaimer, the term of this patent is extended or adjusted under 35 U.S.C. 154(b) by 0 days. days.

(21) Appl. No.: 15/094,236

(22) Filed: Apr. 8, 2016

(65) Prior Publication Data

US 2016/0302443 A1 Oct. 20, 2016

(30) Foreign Application Priority Data

Apr. 14, 2015 (IT) .............................. BO2015A0179

(51) Int. Cl.
*A23G 9/22* (2006.01)
*F25D 11/00* (2006.01)
(Continued)

(52) U.S. Cl.
CPC .............. *A23G 9/227* (2013.01); *A23G 9/08* (2013.01); *A23G 9/22* (2013.01); *A23G 9/28* (2013.01); *F25D 11/00* (2013.01)

(58) Field of Classification Search
CPC . A23G 9/227; A23G 9/28; A23G 9/22; A23G 9/20; A23G 9/305; F25D 11/00; B65D 35/30; B65D 35/40; B65D 85/78
(Continued)

(56) References Cited

U.S. PATENT DOCUMENTS 3,969,531 A 7/1976 Cornelius
4,169,359 A 10/1979 Weerstra
(Continued)

FOREIGN PATENT DOCUMENTS

WO WO2011042489 A1 4/2011
WO WO2012104760 A1 8/2012
(Continued)

OTHER PUBLICATIONS

Italian Search Report dated Sep. 14, 2015 for counterpart Italian application No. BO20150179.
(Continued)

*Primary Examiner* — Mohammad M Ali
(74) *Attorney, Agent, or Firm* — Shuttleworth & Ingersoll, PLC; Timothy J. Klima

(57) ABSTRACT

An ice cream machine for making ice cream, including a processing container forming a processing chamber for making an ice cream-type product; a stirrer mounted inside the processing chamber; a cooling system, provided with at least one heat exchanger associated with the processing container, for exchanging heat therewith; a device for receiving and housing a capsule containing a basic preparation; a device for transferring the basic preparation from the capsule to the processing container; a device for injecting a dilution liquid, associated with the receiving and housing device or with the device for transferring the preparation or with the processing container; dispensing means, connected to the processing chamber for delivering the ice cream-type product to the outside.

11 Claims, 2 Drawing Sheets

(51) Int. Cl.
*A23G 9/28* (2006.01)
*A23G 9/08* (2006.01)

(58) Field of Classification Search
USPC .......................................................... 62/322
See application file for complete search history.

(56) References Cited

U.S. PATENT DOCUMENTS

| | | | | | |
|---|---|---|---|---|---|
| 5,269,146 | A | * | 12/1993 | Kerner | F25B 21/02 165/104.33 |
| 5,713,214 | A | * | 2/1998 | Ugolini | A23G 9/166 137/392 |
| 2002/0048626 | A1 | | 4/2002 | Miller et al. | |
| 2004/0003620 | A1 | * | 1/2004 | Cocchi | A23G 9/22 62/348 |
| 2009/0323462 | A1 | * | 12/2009 | Cocchi | A23G 9/12 366/147 |
| 2012/0199608 | A1 | * | 8/2012 | Cocchi | A23G 9/225 222/146.6 |
| 2013/0000338 | A1 | * | 1/2013 | Cocchi | F25B 1/10 62/190 |
| 2014/0212559 | A1 | * | 7/2014 | Cocchi | A23G 9/224 426/519 |

FOREIGN PATENT DOCUMENTS

| | | |
|---|---|---|
| WO | WO2012160532 A1 | 11/2012 |
| WO | WO2014029803 A1 | 2/2014 |
| WO | WO2015022678 A1 | 2/2015 |

OTHER PUBLICATIONS

European Exam Report dated Sep. 26, 2017 from counterpart European App No. 16164965.2.

* cited by examiner

MACHINE FOR MAKING ICE CREAM

This application claims priority to Italian Patent Application BO2015A000179 filed Apr. 14, 2015, the entirety of which is incorporated by reference herein.

BACKGROUND OF THE INVENTION

This invention relates to a machine for making ice cream.

As is known, a need which is strongly felt by operators in the trade is that of having alternative methods of making ice cream.

In particular, one of the needs which is most strongly felt in the trade in question is that of being able to make ice cream in a particularly simple manner and, if necessary, even in small quantities.

Another particularly strongly felt need is the need for a machine which allows reducing the risks of product contamination, thus increasing food safety.

SUMMARY OF THE INVENTION

The aim of this invention is to provide a machine for making ice cream which allows satisfying the above mentioned need and, more specifically, a machine which allows making small quantities of ice cream particularly easily based on the requirements expressed on the spot by the customer.

Another aim of the invention is to provide a machine for making ice cream which allows reducing the risks of product contamination.

According to the invention, this aim is achieved by a machine for making ice cream and comprising the technical features set out in one or more of the appended claims.

BRIEF DESCRIPTION OF THE DRAWINGS

The technical features of the invention, with reference to the above aims, are clearly described in the claims below and its advantages are apparent from the detailed description which follows, with reference to the accompanying drawings which illustrate a preferred, non-limiting example embodiment of the invention, and in which:

DESCRIPTION OF THE PREFERRED EMBODIMENTS

Figure 1:
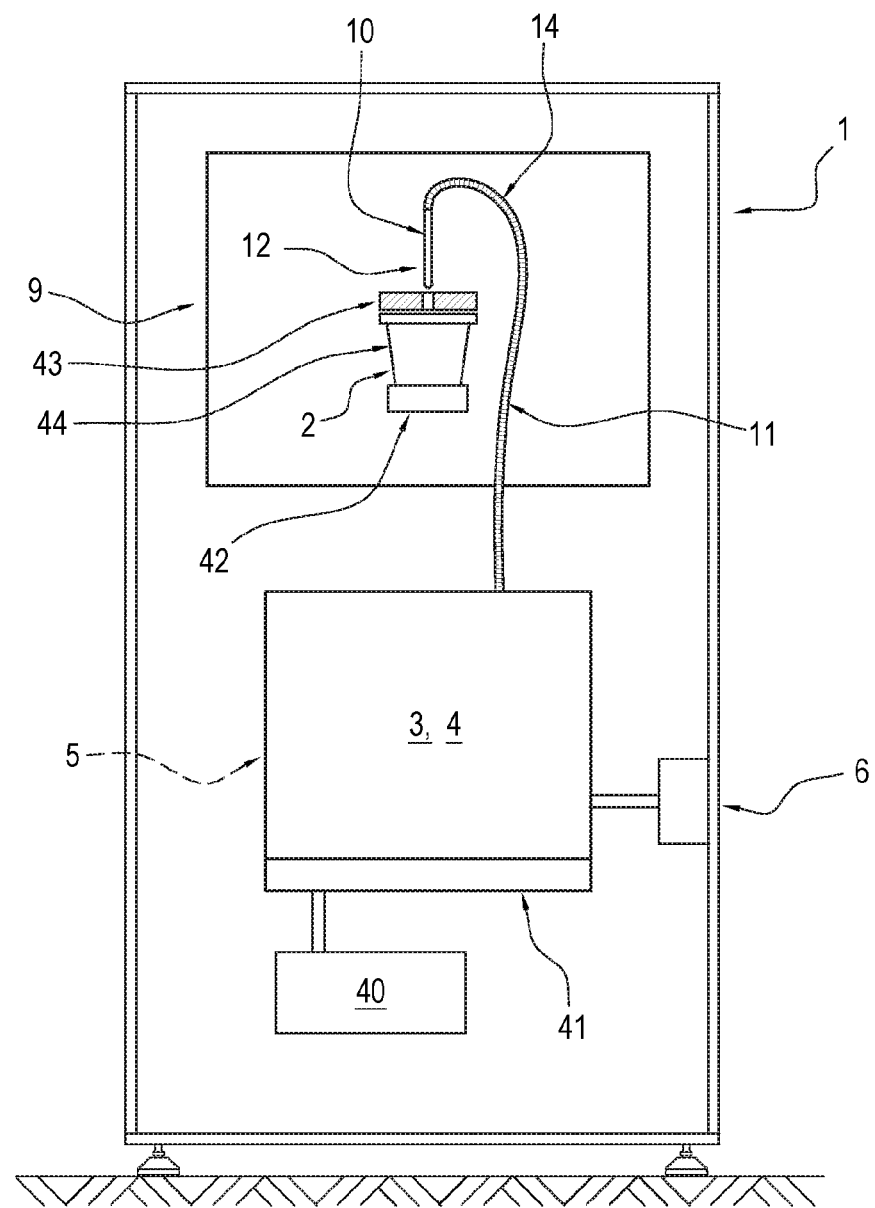
FIG. 1 is a schematic view of a first embodiment of a machine according to this invention.

With reference to the accompanying drawings, the numeral 1 denotes a machine for making ice cream (preferably artisan gelato).

According to the invention, the machine 1 is to all intents and purposes a batch freezing unit (batch freezer).

In the context of the invention, the term "ice cream" is used to mean a food preparation which is based on milk or milk-derived products and to which fruit, aromatics or other ingredients are added to obtain different flavours.

The ice cream machine 1 for making ice cream comprises:
a processing container 3 defining a processing chamber 4;
a stirrer 5 mounted inside the processing chamber 4 (not illustrated and schematically indicated in the accompanying drawings);
a thermal treatment system (for cooling) 40, not illustrated, provided with at least one heat exchanger 41 associated with the processing container 3, for exchanging heat therewith;
a device 9 for receiving and housing a capsule 2 containing a basic preparation (for making ice cream);
a device 11 for transferring the basic preparation from the capsule 2 to the processing container 3;
a device 12 for injecting a dilution liquid (preferably water), associated with the receiving and housing device 9 or with the device 11 for transferring the preparation or with the processing container 3;
dispensing means 6, operating at the processing chamber 4 for delivering the ice cream-type product (that is, the finished product) to the outside.

It should be noted that the stirrer 5 is adapted to be driven in rotation; preferably, the machine 1 comprises an actuator (drive motor) to drive the stirrer 5 in rotation.

With reference to the capsule 2, it should be noted that the capsule 2 may contain one or more liquids, or one or more powders, or a granulate, or a gel, defining a basic preparation for the ice cream type product.

With reference to the device 9 for receiving and housing a capsule 2, it should be noted that the receiving device 9 comprises a cavity (not illustrated in the accompanying drawings) for housing the capsule 2.

The cavity is sized to house the capsule 2, which is preferably slotted therein.

Furthermore, the receiving and housing device 9 preferably, but not necessarily, comprises a locking element for holding the capsule 2 within the housing cavity.

Preferably, the capsule 2 comprises (that is, contains inside it) a basic preparation adapted to allow ice cream to be made.

More preferably, the capsule 2 comprises a concentrated basic preparation.

It should be noted that the expression "concentrated basic preparation" is used to mean a set of specific basic ingredients for making an ice cream product, depending on the type of flavours to be made, and which has been subjected to a thermal treatment (by heating, preferably under pressure lower than atmospheric pressure) in order to cause an at least partial evaporation of water (contained in the ingredients themselves).

It should be noted that, advantageously, each capsule 2 contains the preparation needed to make one or more portions of ice cream, thus avoiding the need to make a large quantity of finished product and allowing implementation of a production system (on demand system) to make exactly what the customer wants.

It should be noted that the receiving and housing device 9 is positioned preferably above the container 3, that is, above the processing chamber 4.

According to another aspect, the device 12 for injecting a dilution liquid is configured to deliver water or a water-based mixture so as to allow diluting the basic preparation in the capsule 2 with water or a water-based mixture.

Alternatively, the device 12 for injecting a dilution liquid is configured to deliver milk or a milk-based mixture so as to allow diluting the basic preparation in the capsule 2 with milk or a milk-based mixture.

More generally speaking, the device 12 for injecting a dilution liquid is adapted to deliver a dilution liquid.

Preferably, the injection device 12 also comprises a tank for containing the dilution liquid.

The injection device 12 preferably further comprises a transfer pump for transferring the dilution liquid from the tank containing it to the point of delivery/dilution (where the dilution liquid is delivered and mixed with the basic preparation).

It should be noted that the device 12 for injecting a dilution liquid may be associated with the receiving device 9: in that case, the dilution liquid is preferably delivered directly into the capsule 2.

According to this aspect, therefore, the device 12 for injecting a dilution liquid is preferably configured to deliver the dilution liquid into the capsule 2.

It should be noted that, according to another aspect, the machine 1 may comprise one or more piercing elements 10 adapted to pierce the walls of the capsule 2 in order to open the capsule 2.

The piercing element/elements 10 may be internally hollow to allow the dilution liquid to be delivered into the capsule 2 after piercing the capsule walls.

The machine 1 may further comprise at least one actuator 42 configured to move the piercing nozzle 10 and the capsule 2 relative to each other.

Preferably, the actuator 42 is configured to move the piercing nozzle 10 relative to the capsule 2 between a position of non-contact and a position of contact when the capsule 2 is pierced.

According to another aspect, the piercing element 10 is equipped with a piercing tip.

According to yet another aspect, on the other hand, the device 12 for injecting a dilution liquid may be associated with the device 11 for transferring the basic preparation.

Figure 2:
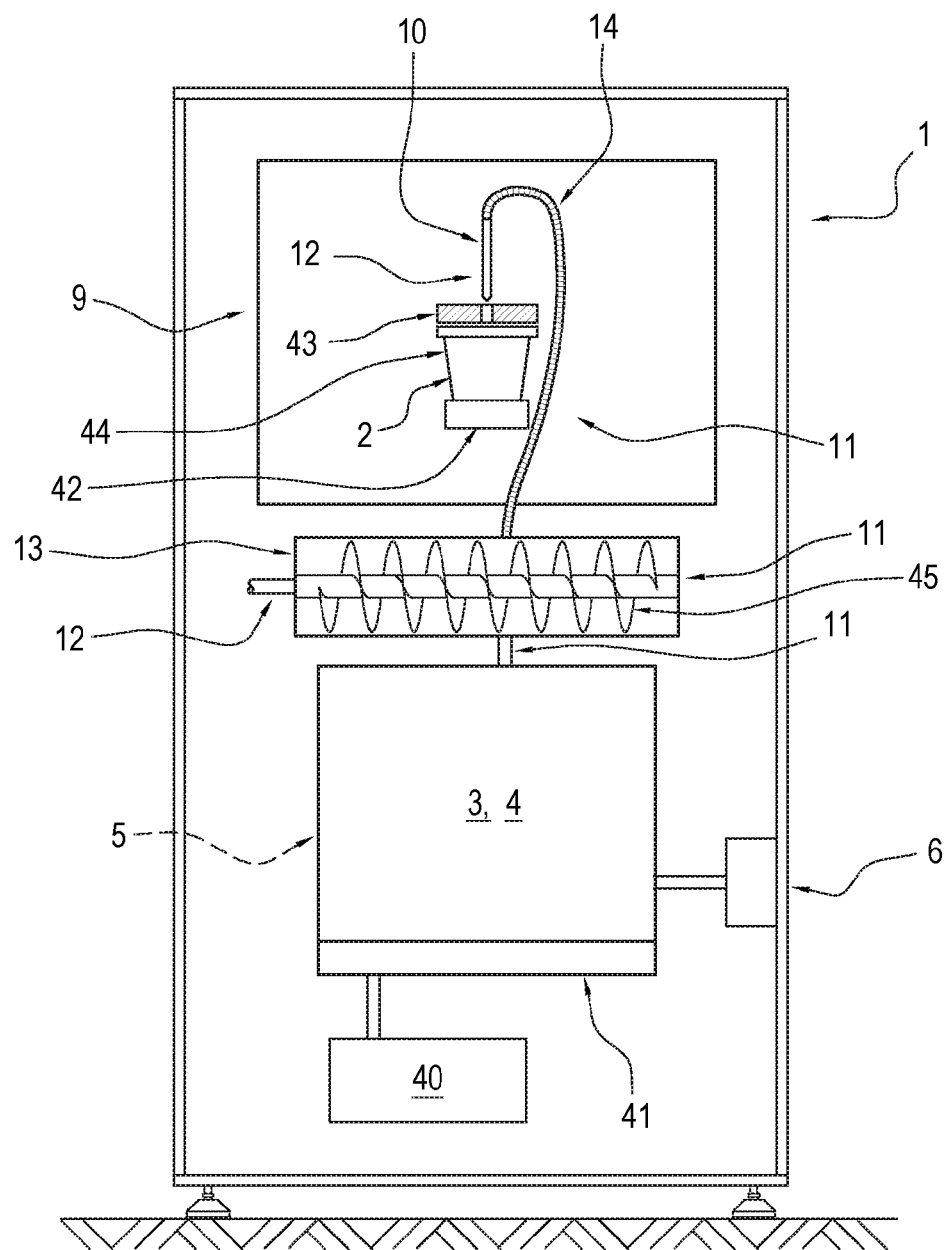
FIG. 2 is a schematic view of a second embodiment of a machine according to this invention.

According to this aspect, the device 11 for transferring the preparation preferably comprises a mixing chamber 13 (as illustrated in FIG. 2).

More specifically, the device 12 for injecting a dilution liquid may be associated with the mixing chamber 13 (as illustrated in FIG. 2), that is, it is configured to deliver the dilution liquid directly into the mixing chamber 13.

Thus, advantageously, the dilution liquid is delivered directly into the mixing chamber 13.

Thus, the basic preparation is transferred from the capsule 2 to the mixing chamber 13, preferably by way of a duct 14.

At the mixing chamber 13, the dilution liquid is mixed with the basic preparation.

Preferably, the mixing chamber 13 is equipped with a stirrer, that is a rotary mixer 45, mounted inside the mixing chamber 13 and configured to rotate in such a way as to promote mixing of the basic preparation with the dilution liquid inside the chamber itself.

According to another aspect, the device 12 for injecting a dilution liquid may be associated with the processing chamber 4, that is, with the container 3.

According to this aspect, the dilution liquid is delivered into the processing chamber 4: thus, the injection device 12 is configured to deliver the dilution liquid into the processing chamber 4.

Preferably, the processing container 3 is cylindrical in shape.

Preferably, the heat exchanger 41 is wound in a coil on the walls of the cylindrical container 3.

Preferably, the processing container 3 is provided with a door (at the front) for cleaning, and/or extracting the product from, the processing chamber 4.

The mixing and simultaneous thermal cooling treatment step is carried out inside the mixing container 3 so as to convert the basic preparation, diluted with the dilution liquid, into the finished, ice cream type product.

It should be noted that during the mixing and cooling step, the basic preparation (diluted with the dilution liquid) is treated at a temperature between −11° C. and −3° C.

Thus, the cooling system 40 is configured to cool the basic preparation (diluted with the dilution liquid) inside the container 3 down to a temperature between −11° C. and −3° C.

It should be noted that the cooling system 40 preferably comprises a compressor and a hydraulic circuit containing a heat exchanger fluid.

The heat exchanger 41 is configured to allow heat exchange between the heat exchanger fluid and the basic preparation (diluted with the dilution liquid, if necessary) inside the container 3.

Preferably, the cooling system 40 is configured to operate according to a thermodynamic cycle, preferably a vapour compression cycle.

With reference to the capsule 2, it should be noted that the capsule 2 has a top wall, a bottom wall and a side wall connecting the top wall to the bottom wall.

These walls enclose an internal space containing one or more basic products defining the basic preparation.

According to another aspect, the capsule 2 is a deformable capsule (so that its internal containment space can be reduced).

More precisely, the side walls 44 are preferably deformable.

According to this aspect, the device 11 for transferring the basic preparation from the capsule 2 to the processing container 3 comprises at least one compressing element 43 adapted to squeeze the capsule 2 in order to deform (reduce) the containment space thereof.

According to this aspect, the compressing element 43 is movable between a position in which it does not interfere with the capsule 2 and a position in which it makes contact with the capsule 2 and compresses the walls 44 of the capsule 2 (that is to say, reduces the size of the space inside the capsule 2).

It should be noted that compressing the capsule 2 by the compressing element 43 causes the basic preparation (preferably already diluted with the dilution liquid) to be squeezed out of the capsule 2.

It should be noted that the capsules 2 are preferably axisymmetric.

Preferably, the capsules have a maximum diameter of between 51 and 84 mm.

Also, preferably, according to another aspect, the capsules 2 have a depth/height of between 37 and 50 mm.

With reference to their weight, it should be noted that the capsules 2 preferably contain basic preparation weighing between 5 and 100 g.

With reference to the dispensing means 6, it should be noted that these may be operated manually or automatically.

Preferably, the dispensing means 6 comprise a nozzle.

With reference to another aspect, not illustrated, it should be noted that the machine comprises a support for a container (e.g. a cup) adapted to receive the finished product from the dispensing means 6.

It should be noted that the support is configured to vibrate so as to allow better distributing the product inside the cup.

It should be noted that the support is made to vibrate while the cup placed on the support itself is being filled so that the cup vibrates while it is being filled.

Preferably, the machine comprises a vibrating actuator connected to the support and adapted to impart vibrations thereto.

It should be noted that the machine 1, using capsules 2, advantageously allows making very small quantities of ice cream in very short spaces of time.

Thus, the requirements of end consumers can be satisfied very rapidly by making even very small quantities of ice cream.

Furthermore, with reference to the advantages of the invention, it should be stressed that the machine 1 avoids the need to handle the food product, thus substantially minimizing the risk of contamination.

Thus, a food product of particularly high quality can be guaranteed.

Further, the machine according to this invention can be cleaned in a particularly quick and easy manner (using a cleaning-in-place procedure).

Moreover, the machine 1 of the invention has a particularly reduced footprint, which means that shop floor space can be optimized.

The advantages of the machine 1 of the invention also include a reduced impact on the environment and reduced maintenance requirements.

What is claimed is:

1. An ice cream machine for making ice cream, comprising:
   a processing container forming a processing chamber for making an ice cream product;
   a stirrer mounted inside the processing chamber;
   a cooling system, including a heat exchanger associated with the processing container, for exchanging heat with the processing container;
   a receiving and housing device for receiving and housing a capsule containing a basic preparation for ice cream;
   a transferring device for transferring the basic preparation from the capsule to the processing container;
   an injection device for injecting a dilution liquid, the injection device associated with the processing container and configured to release the dilution liquid into the processing container;
   a dispenser, operating at the processing chamber for delivering the ice cream product to the outside.

2. The machine according to claim 1, comprising a nozzle for piercing the capsule to open the capsule.

3. The machine according to claim 1, comprising a transfer duct for transferring the basic preparation from the capsule to the processing container.

4. The machine according to claim 2, comprising an actuator configured to move the piercing nozzle and the capsule relative to each other.

5. The machine according to claim 1, wherein the capsule includes deformable walls and the transferring device comprises at least one compressing element, associated with the receiving and housing device and movable between a position in which the compressing element does not interfere with the capsule and a position in which the compressing element makes contact with and compresses the walls of the capsule when the capsule is received and housed in the receiving and housing device.

6. The machine according to claim 1, wherein the transferring device comprises a mixing chamber.

7. The machine according to claim 1, wherein the injection device for injecting a dilution liquid is associated with the mixing chamber, for releasing the dilution liquid into the mixing chamber, the mixing chamber being connected to the processing container for releasing to the processing container the basic preparation diluted with the dilution liquid.

8. The machine according to claim 6, wherein the transferring device comprises a rotary mixer, associated with the mixing chamber, and configured to rotate inside the mixing chamber so as to promote mixing of the basic preparation with the dilution liquid.

9. The machine according to claim 1, wherein the transferring device comprises a connecting duct connecting the injection device to the processing container for transferring, the basic preparation directly from the capsule to the processing container.

10. The machine according to claim 1, wherein the injection device is associated with the processing container and is configured to release the dilution liquid into the processing chamber.

11. The machine according to claim 1, wherein the injection device is associated with the receiving and housing device for releasing the dilution liquid directly into the capsule when the capsule is received and housed in the receiving and housing device.

* * * * *